United States Patent [19]

Weinberg

[11] Patent Number: 4,908,198

[45] Date of Patent: Mar. 13, 1990

[54] FLUORINATED CARBONS AND METHODS OF MANUFACTURE

[75] Inventor: Norman L. Weinberg, E. Amherst, N.Y.

[73] Assignee: The Electrosynthesis Company, Inc., East Amherst, N.Y.

[21] Appl. No.: 869,286

[22] Filed: Jun. 2, 1986

[51] Int. Cl.$^4$ .............................................. C01B 31/00
[52] U.S. Cl. .................................... 423/415 R; 148/4; 204/294; 423/439; 429/218; 502/181; 502/416
[58] Field of Search .................... 423/439, 415 R, 461; 429/218, 49; 502/181, 416, 22; 204/294; 148/1.4

[56] References Cited

U.S. PATENT DOCUMENTS

| | | | |
|---|---|---|---|
| 2,709,186 | 5/1955 | Farlow et al. | 423/439 |
| 3,340,081 | 9/1967 | Teter | 106/307 |
| 3,674,432 | 7/1972 | Margrave et al. | 23/205 |
| 4,105,836 | 8/1978 | Almerini | 429/194 |
| 4,119,655 | 10/1978 | Hulme | 260/440 |
| 4,316,782 | 2/1982 | Foller et al. | 204/129 |

FOREIGN PATENT DOCUMENTS 57-2425  9/1977  U.S.S.R. .............................. 423/439

OTHER PUBLICATIONS

Hackh's Chemical Dictionary, 4th Ed., Julius Grant, ed. McGraw-Hill Book Co. 1969, pp. 15, 147, 378, 625.
"Fluorination of Carbon Black", Watanabe et al., *Carbon*, vol. 17, p. 359, 1979.
Peter C. Foller et al., Electrochemical Generation of High-Concentration Ozone for Waste Treatment, CEP, Mar. 1985, 49-51.

*Primary Examiner*—Jeffrey Edwin Russel
*Attorney, Agent, or Firm*—Howard M. Ellis

[57] ABSTRACT

Discontinuities, edge sites and grain boundaries in carbons, the primary locations of instabilities for oxidative corrosion and degradation, are prepared by preoxidation to form carbon-oxides followed by highly selective and relatively mild fluorination to specifically substitute carbon-oxygen functionality with stable carbon-fluorine groups. The novel fluorinated carbons have enhanced chemical and/or electrochemical stabilities to corrosion, improved hydrophobicity, lubricating properties, etc.

35 Claims, No Drawings

FLUORINATED CARBONS AND METHODS OF MANUFACTURE

This invention was made with Government support under Contract No. DMR-8460341, awarded by the National Science Foundation. The Government has certain rights in this invention.

BACKGROUND OF THE INVENTION

The present invention relates to novel fluorinated carbons, and more specifically, to improved amorphous, crystalline and glassy or vitreous fluorinated carbons, products made therefrom and methods of manufacture.

Carbons, which includes both amorphous and crystalline types like carbon blacks, lamp black, graphitic and pyrolitic types, to name but a few, find use in a multitude of important and often critical applications in modern technology ranging from motor brushes, lubricants, batteries, fuel cells, plastic refractories, heat exchangers, composites, nuclear generators, resistors, catalyst supports and so on. A major shortcoming, however, in many applications for carbons is often the limited useful life as a result of oxidative degration.

One solution to the problem of oxidative degration has been the direct fluorination of carbon with elemental fluorine. Direct fluorination methods are disclosed by W. O. Teter el al in U.S. Pat. No. 2,786,874 (1957), J. L. Margrave in U.S. Pat. No. 3,674,432 (1972), D. T. Meshri et al in U.S. Pat. No. 3,929,918 (1975) and T. Komo et al in U.S. Pat. No. 3,929,920 (1975).

Fluorographites, for example, prepared by the direct fluorination method are typically hydrophobic, possess high temperature stability, are insoluble in organic solvents and are relatively unreactive, being attacked neither by strong acids nor by alkalies. They may be represented empirically as $(CF_x)_n$ where their specific properties depend on the values for x and n. Fluorographites, for instance, in the range of $CF_{0.5}$ to $CF_{1.0}$ are used in lithium $CF_x$ batteries as positive electrodes. These batteries possess a high energy density of 320 to 470 watt hour/kg, a high open circuit voltage of 2.8 to 3.2 volts, a high working voltage of about 2.6 volts and a long shelf life. However, the useful range of fluorographite batteries prepared by the direct fluorination method is limited because as values for x increase resistivity greatly increases. In fact, the highly fluorinated material $CF_{1.1}$ is almost an insulator or nonconductor.

Not only is fluorographite, for example, manufactured by a costly somewhat hazardous process by direct fluorination with fluorine gas, but frequently undergoes degradation in the process. Strong, highly reactive fluorinating agents, such as elemental fluorine, $ClF_3$, $ClF$, $CoF_3$, etc., have a tendency to produce nondiscriminating reactions with carbon molecules even causing fragmentation of edge sites, grain boundaries, dislocations and other surface imperfections. Strong, nonselective fluorinating agents tend to fluorinate olefinic and aromatic carbon to carbon unsaturation sites, adding to the layered planes of benzene rings of the molecule to provide nonconductive carbons.

According to the present invention, it was discovered that "soft" fluorinating agents are more selective in their attack of functional groups, showing less tendency to degrade and fragment edge sites, grain boundaries, etc., than strong fluorinating agents, like elemental fluorine. That is to say, it was found that soft fluorinating agents, like $SF_4$ will not react with carbon to carbon olefinic bonds in carbon structures, but instead react with carbon-oxygen bonds to replace oxygen with fluorine at edge sites, grain boundaries, dislocations and other surface imperfections, which are also the same sites where oxidative attack of carbons usually occur. Accordingly, it was postulated that if most potentially oxidation sensitive regions of carbon structures could be selectively fluorinated stable graphite and other carbons could be prepared with greatly improved life expectancies while retaining their desired thermal and electrical properties.

A. C. Teter in U.S. Pat. No. 3,340,081 recognized the incidental presence of surface oxygen in commercial carbon blacks. However, Teter failed to recognize the beneficial effect of specifically pretreating carbon blacks before fluorination to first develop most of the sites of potential instability to oxidative corrosion and degradation. Instead, without further oxidative pretreatment, Teter proceeded directly to fluorinate commercial carbon black with $SF_4$ or other organic sulfur trifluoride fluorinating agent to a maximum level of 7 percent by weight fluorine to prepare reinforcing agents for butyl rubber vulcanizates.

Accordingly, one aspect of the present invention relates to novel fluorinated amorphous and crystalline carbons and methods of manufacturing such carbons which have longer life expectancies, yet materially preserve their desirable thermal and electrical properties. By developing essentially all such potential sites of oxidative corrosion and degradation prior to fluorination, carbons having higher levels of fluorination can be prepared at relatively low cost by less hazardous specific fluorination methods.

Fuel cells require the use of gas (air or oxygen) depolarized electrodes which are comprised of highly sophisticated mixtures of various carbons, catalysts and polymers, along with other additives, and supportive structures which make up a solid composite electrode. The successful operation of a fuel cell electrode is governed by establishing three-phase interface sites: gas (usually oxygen or air), electrolyte solution (often aqueous acid or base) and the solid composite electrode. However, after extended use, depolarized carbon electrodes tend to become oxidized, lose their hydrophobic properties and "flood" when electrolyte penetrates into their porous structures. Electrolyte solution is drawn further into the electrode structure with eventual depletion of the useful three-phase interface sites. Furthermore, once flooding has ocurred the problem is often irreversible and the fuel cell becomes inoperable. This surface oxidation of carbons and tendency to transform from hydrophobic to hydrophilic properties is also a problem in metal air batteries, e.g. zinc-air batteries and in bifunctional air electrodes. The problem is especially severe in bifunctional air electrodes, since in this instance the gas diffusion electrode acts as an oxygen-evolving electrode in the charge step and is further oxidized. To overcome these problems, workers have sought to use more stable carbons like graphite carbons prepared under special conditions at high temperatures. Catalysts have also been incorporated into composite electrode structures to destroy peroxide species, which form to some extent with reduction of the oxygen or air feed, and which accounts for some of the oxidative degradation of carbon surfaces.

Accordingly, a further aspect of the present invention is the preparation of improved fluorinated carbon composites, including fuel cell electrodes, metal-air batteries and bifunctional air electrodes. The improved fluorinated carbons more effectively protect sites on the carbon electrodes which would otherwise be prone to flooding and additional degradation. The present invention also provides a method for regenerating spent-flooded gas diffusion electrodes for reuse by specific fluorination, as described in further detail below.

It has been known for many years that ozone, $O_3$, could be produced electrochemically using various kinds of anodes, e.g. lead dioxide and platinum, in cold acidic electrolyte solutions, like sulfuric acid and phosphoric acid. In most cases, however, the energy conversion efficiencies were found to be low. More recently, Foller et al reported in CEP. (49–51), Mar. 1985 that ozone could be generated at much higher current efficiencies using vitreous or glassy carbon anodes in a 48 percent aqueous tetrafluoboric acid solution. In spite of the apparent advantages of electrochemical ozone generation with vitreous carbon anodes their exposure to highly corrosive acidic electrolytes has been found to shorten their useful life expectancies, making them a less attractive alternative. Moreover, current efficiencies for ozone are still too low and uneconomical for many applications.

Accordingly, a further aspect of the present invention, relates to the discovery that fluorination of vitreous or glassy carbons results in a material which is considerably more stable to corrosion in cold aqueous acids, including sulfuric, phosphoric and tetrafluoboric acids making such carbons currently more suitable and economical as anodes in the electrochemical generation of ozone as well as for other uses as anodes, such as persulfate formation.

SUMMARY OF THE INVENTION

The present invention relates to specifically fluorinated carbons and methods of manufacture, including specifically fluorinated amorphous, crystalline and vitreous carbons. The fluorinated carbons are characterized by improved chemical and/or electrochemical stabilities to corrosion, enhanced hydrophobic properties, lubricating properties, chemical and electrochemical catalysis, and support structure for deposited catalysts, while maintaining all or virtually all the desirable physical and chemical properties, e.g. thermal and electrical conductivities, for which a particular carbon or graphite was chosen. Accordingly, the fluorinated carbons, amorphous, crystalline and vitreous types, are adaptable to a wide range of applications which take advantage of these properties, such as in fuel cells, batteries, specialty electrodes, catalyst supports, lubricants, liners for chemical reactors, structural composites with metals and polymers for nuclear reactors, heat exchangers and seal rings. Many of such applications take advantage of both the surface and bulk chemical and physical properties of the carbons.

The specifically fluorinated carbons are prepared by preoxidizing discontinuities, edge sites and grain boundaries to form carbon-oxide groups at essentially all primary sites of oxidative instability on the carbon structure, followed by highly selective and relatively mild fluorination of the preoxidized carbon with a "soft" fluorinating agent, such as sulfur tetrafluoride or any other fluorinating agent capable of specifically substituting carbon-oxygen functionality with carbon-fluorine groups. Thus, the invention contemplates fluorinated carbons having fluorine covalently bonded to discontinuities, carbon edge sites and grain boundaries of carbon structures. By contrast, sites of olefinic and aromatic carbon-to-carbon unsaturation, including carbon basal planes in more structured graphitic type carbons are substantially free of such bonded fluorine.

According to the present invention, amorphous carbons and crystalline carbons are fluorinated with a soft fluorinating agent to a fluorine content up to about 20 percent and 10 percent by weight, respectively. However, the mildly fluorinated carbons can be fluorinated to even higher levels by post fluorinating with "hard" fluorinating agents, like elemental fluorine which add to sites of olefinic and aromatic carbon to carbon unsaturation.

DESCRIPTION OF THE PREFERRED EMBODIMENTS

In accordance with the present invention, carbons are preoxidized to more fully develop potential sites of instability with the ultimate objective of protecting those regions with stable carbon-fluorine bonds.

Carbons found most suitable for use in accordance with the invention are selected from amorphous or microcrystalline and crystalline types. Amorphous carbon is intended to mean imperfectly ordered molecular structures having relatively high surface areas, and which may also possess some incidental reactive oxygen sites. Here, planes of atoms are layered, irregular and unoriented without extensive growth in any direction. Cross-linking between the planes accounts for their greater hardness and mechanical strength compared to graphitic structures which lack cross-linking of planes. Controlled heating can often convert them to graphitic carbons. Amorphous carbons include carbon blacks, like lamp black, thermal black, channel black, acetylene black and furnace blacks. Other amorphous carbons include activated carbons, vitreous or glassy carbons, chars, soot, charcoal, and the like. They are commercially available in various forms including powders, woven carbons, felts, carbon fibers, to name but a few.

In contrast to amorphous type carbons are the crystalline or graphitic type carbons, e.g. graphites and pyrolytic graphites, which exhibit a more ordered molecular structure, closer spacing between monoplanes and stacks and relatively low surface areas, and therefore, have greater stability to oxidation. They have substantially better electrical and thermal conductivities than amorphous carbons and are available as powders, woven materials, felts, fibers and other forms.

The present invention contemplates fluorination of virtually all forms of carbons, including powders, fibers, flakes, as well as solid masses of any crystallographic orientation, crystallite size, interlayer spacing, interatomic distance, density, porosity, particle size or shape. However, the fluorination methods of this invention extend beyond carbons per se, but can also be used in fluorinating various "carbon substrates", which term is intended to mean carbon containing materials and articles like carbon steels which are alloys of iron. In carbon steels or mild steels carbon is the most important alloying element although such steels usually contain less than 1.5 weight percent carbon. Composites are also included within the meaning of the expression "carbon substrates". Composites are intended to mean two or more chemically distinct materials with a distinct interface separating the components. Composites usually comprise carbon or graphitic fibers or cloth as a reinforcing agent in a more ductile matrix, such as epoxy or other resin or plastic material, although a metal matrix can also be employed. Carbon or graphite powders can also be used in composites in which two different forms of carbon are used in the same structural unit.

Solid carbons and graphites, such as electrodes are also carbon substrates within the meaning of the foregoing definition treatable according to the present invention. Electrodes may be formed by high temperature sintering of carbon or graphite powders, flakes or other carbonizable materials with binders, like oil, pitch or tar. These materials are first mixed and then extruded, shaped or molded and then fired to a temperature to carbonize the binder. Further firing at higher temperatures may also be carried out to graphitize the mass. The solid mass will usually be substantially porous, which can be reduced by impregnating with a carbonizable material and then fired.

Because of the broad variety of carbons and carbon-substrates suitable for fluorination according to the present invention there may be wide differences in the level of chemically bonded fluorine. Fluorination occurs at the edge sites of planes and at imperfections on surface layers. Edge and plane defects are more numerous in the amorphous carbons, e.g., charcoal, coke and the carbon blacks than in graphitic carbons. As a result, the amorphous carbons are more readily fluorinated than graphitic carbons, and can be fluorinated to higher levels than crystalline carbons. Pyrolytic graphite has a near perfect crystal structure and will have low levels of bonded fluorine. Carbon blacks for purposes of the present invention will be specifically fluorinated to a minimum of at least 8 percent by weight fluorine, and more particularly, from 8 to about 20 percent by weight. Other amorphous carbons, e.g. activated carbons, chars, coke, vitreous or glassy carbons, etc. in powder form, cloths, felts, fibers, carbon substrates and the like will be fluorinated to at least 0.1 percent by weight, and more particularly, from about 0.1 to about 20 percent by weight. In the case of crystalline carbons, they will be specifically fluorinated to at least 0.01 percent by weight fluorine, and more particularly, from about 0.01 to about 10 percent by weight.

The expressions—specific fluorination or specifically fluorinated carbon—for purposes herein are intended to mean fluorination of carbons at locations of instability, e.g. edge sites, dislocations, grain boundaries and other similar regions as they occur in carbon structures, which locations have carbon oxide functionality selectively fluorinated to form stable carbon-fluorine bonds thereat. Specifically fluorinated carbons may be formed by the steps of preoxidizing potential sites of instability to form carbon-oxide surfaces. The preoxidized carbon or carbon substrate is then fluorinated with a "soft" fluorinating agent to convert these carbon oxide groups to stable fluorocarbon bonds thereby protecting these otherwise unstable sites. Thus, for most embodiments the initial step of the invention provides for developing the unstable sites and regions by oxidation to form carbon-oxide surfaces. As used herein, the terms "oxidation" and "preoxidation" with respect to carbon surfaces are intended to mean the specific development of sites of potential instability to oxidative corrosion and degradation in carbons and carbon substrates by forming reactive oxides thereat at levels in excess of those present before such development. It is also to be understood, the term—surfaces—with regard to the steps of preoxidation and specific fluorination is not intended to be limited to the outermost layers of the carbons but may also include interior substructures, depending on the type of carbon, density or degree of porosity of the material being treated.

Developing the potential sites of instability by preoxidation can be performed chemically or electrochemically. Chemical oxidation methods are carried out by immersion of the carbon or carbon substrate in aqueous and non-aqueous oxidizing solutions, containing such oxidizing agents as nitric acid, potassium permanganate, sodium hypochlorite and ammonium persulfate. Chemical oxidation also includes thermal methods where the carbon is heated in the presence of oxygen, air or carbon dioxide. Chemical oxidation of carbon has been described by H. P. Boehm, et al, *Angew Chem. Internat. Edit*, 3,669 (1964) and, *Anorg. Chem.* 353,236 (1967).

In an alternative method, carbons can be electrochemically preoxidized, for example, in 15 percent aqueous sulfuric acid by polarizing the carbon anodically. Electrochemical oxidation of carbon is described by N. L. Weinberg, and T. B. Reddy, *J. Appl. Electrochemistry* 3,73 (1973). Using such methods, the principal carbon oxide species formed are the strongly acidic carboxylic acid, weakly acidic carboxylic acid, phenolic hydroxyl and carbonyl groups. The electrochemical method of carbon oxide formation is generally preferred over the chemical method for electrode uses because of better reproducibility and convenience.

In treating carbons, they are usually preoxidized to further develop most or essentially all the potential sites of instability. However, at minimum the carbon is oxidized at least to a level of oxidation consistant with the desired level of specific fluorination. Thus, chemical or electrochemical preoxidation is conducted to a level, such that specific fluorination with, e.g. sulfur tetrafluoride, provides carbons generally with about 0.1 to about 20 percent by weight fluorine. Those carbons like carbon blacks having some incidental reactive oxygen sites are preoxidized to more fully develop potential sites of instability. That is, carbon blacks, for instance, having 5 percent by weight surface oxygen will be developed to at least 8 percent by weight and subsequently fluorinated to convert the carbon-oxide groups to stable fluorocarbon bonds.

As a further aspect of the invention, in certain embodiments the preoxidation step is performed in-situ, and therefore, a separate step for developing all potential sites of oxidative corrosion and instability can be omitted. That is, in regenerating spent electrodes, for example, a separate oxidizing step to fully develop the edge sites, grain boundaries, etc., prior to fluorination can be dispensed with because the electrode surfaces were oxidized in the course of regular use. Oxidation of the electrode surfaces caused them to become hydrophilic and to flood. Hence, essentially all potential sites have been fully developed in-situ during use, and the spent electrodes can be regenerated by specifically fluorinating with a soft fluorinating agent, etc. However, it is to be understood that electrodes not previously used, and therefore not oxidized can be preoxidized and specifically fluorinated according to the methods disclosed herein.

Preferably, before specifically fluorinating, the carbon or carbon substrate is cleaned by the steps of washing thoroughly in water to remove any oxidant or other reagent, and then thoroughly dried since water vapor remaining in the oxidized carbon will tend to react with the specific fluorinating agent consuming, and hence wasting the agent until all the water is reacted. Drying may be performed in a suitable dessicator or reactor in an inert atmosphere at about 100° to about 400° C., and more preferably, at about 200° to about 300° C. Drying may be accelerated if conducted under vacuum.

The carbon is then specifically fluorinated with a "soft" fluorinating agent which, for purposes of the present invention is intended to mean a fluorine-containing compound which will not cause carbon-to-carbon fragmentation, but instead will react with carbon-oxygen bonds with replacement of oxygen by fluorine. Generally, such agents will not react with olefin carbon-to-carbon sites in the carbon structure. Soft fluorinating agents include compounds of the formula:

$$R-SF_3$$

wherein R is fluorine, alkyl, aryl aralkyl or dialkylamino.

Specific representative examples of soft fluorinating agents are: sulfur tetrafluoride, n-propylsulfur trifluoride, decysulfur trifluoride, cyclopentylsulfur trifluoride, diethylaminosulfur trifluoride, dimethylaminosulfur trifluoride, phenylsulfur trifluoride. Also included, are the alkyl - and arylsulfur trifluorides prepared and described by W. A. Sheppard, *J. Am. Chem. Soc.* 84, 3058 (1962).

Specific fluorination with the soft fluorinating agents form trifluorocarbon, difluorocarbon and monofluorocarbon bonds from carboxyl, carbonyl and hydroxyl groups respectively. Fluorination is conducted to the extent that the carbon or graphite is stabilized, or substantially all carbon oxide functionality is converted to carbon-fluorine bonds. It may be carried out in a suitable reactor usually first flushed with a dry inert gas, e.g. nitrogen. If, for instance, sulfur tetrafluoride is used, the reactor or pressure vessel is usually cooled with, for example, a bath of dry ice-acetone, evacuated to about 1 mm of pressure and sulfur tetrafluoride, for example, then introduced in excess. After sealing the vessel it is warmed gradually and then heated for varying lengths of time, up to about 25° to about 500° C., and more preferably, from about 100° to about 250° C. The reaction time may be about 15 minutes to about 10 days depending on the temperature. The reaction pressure may vary from about atmospheric to about 500 psig. Depending on the intended use of the selectively fluorinated carbon or carbon substrate the amount of soft fluorinating agent, e.g. sulfur tetrafluoride employed can be substantially less than the estimated equivalent needed to convert all carbon "oxide" functionality, equivalent to the carbon oxide functionality, or up to an amount which is considerably more than that required stoichiometrically. If used in excess, sulfur tetrafluoride, for example, may be present in up to about 100 fold by weight or more of that amount actually required.

Other soft fluorinating agents like selenium tetrafluoride, diethylaminosulfur tetrafluoride and alkyl - or arylsulfur tetrafluorides and the like, as well as mixtures of these, may be conveniently used in an inert solvent, such as methylene chloride, chloroform, carbon tetrachloride and 1,1,2-trifluorotrichlorethane. The fluorinating agents in such solvents may be used at atmospheric pressure or above, and at temperatures, usually from room temperature and up to the boiling point of the solution. Because many of these fluorinating agents are liquids at room temperatures and above, they may also be used without a solvent. If a solvent is utilized it may be present in any concentration up to a large excess, such that the fluorinating agent is present in an amount from 1 to about 90 percent volume, and more preferably, from about 5 to about 75 percent.

Specific fluorination of the carbons may be performed in the presence of a sufficient amount of a catalyst, either fluorine or non-fluorine containing. Fluorinated catalysts include hydrogen fluoride, boron trifluoride, arsenic trifluoride, sodium and potassium fluorides, titanium tetrafluoride and lead tetrafluoride. Non-fluorine containing catalysts include lead oxide, titanium oxide, trimethyl and triethylamines and pyridine. All such catalysts are useful with soft fluorinating agents.

As an optional pretreatment step, prior to specifically fluorinating with soft fluorinating agent, dried oxidized carbons may be treated with a very soft fluorinating agent, much as hydrogen fluoride, potassium hydrogen fluoride, potassium fluorosulfinate, thionyl fluoride, cyanuric, etc. This optional pretreatment is useful for converting pendant carboxyl groups to acyl fluorides, and may be carried out, for example, by passing anhydrous hydrogen fluoride over heated carbon. Treatment with HF may run for several hours until substantially all reactive carboxylic acid, olefinic carbons and other more highly reactive sites have been partially fluorinated. One such method is also described in U.S. Pat. No. 3,929,918 (D. T. Meshri et al).

As a further optional step, the specifically fluorinated carbons may be further fluorinated with a "moderate" or "hard" fluorinating agent. That is, the specifically fluorinated carbon and carbon substrates having up to 20 percent by weight fluorine can be post-fluorinated to higher levels, i.e. 65 percent by weight fluorine, particularly in the case of amorphous type carbons. These post fluorinated specifically fluorinated carbons are specially useful as lubricants and in Li/CFx batteries.

Post fluorinations with "hard" fluorinating agents is intended to refer to fluorine-containing compounds which are capable of reacting nondiscriminatively with carbon molecules, and in some instances even result in their fragmentation. They tend to fluorinate olefinic and aromatic carbon-to-carbon unsaturation sites, adding to the layered planes of benzene rings of the carbon molecule. Representative examples include $F_2$, ClF, $ClF_3$, $BrF_3$ and $MF_n$ wherein M is cobalt, antimony, manganese, cerium or uranium and n is a number corresponding to the highest oxidation state of M.

The "moderate" fluorinating agents are fluorine-containing compounds which are somewhat less reactive and more selective than hard fluorinating agents, but are capable of producing reactions which are comparable to the hard fluorinating agents, and include such representative examples as $HgF_2$, $SbF_5$, $SbF_3/SbCl_5$, $AsF_3$, $CaF_2$, $KSO_2F$, $AsF_5$, etc.

After completion of the oxidation and all fluorination steps the specifically fluorinated carbon, graphite or carbon substrate is treated to remove any traces of unreacted fluorinating agents and byproducts. This may be accomplished, for example, by purging the fluorinated material with an inert gas followed by thorough washing in water, and drying under vacuum at 150° C. and 1 mm pressure.

The following specific examples demonstrate the various aspects of this invention, however, it is to be understood that these examples are for illustrative purposes only and do not purport to be wholly definitive as to conditions and scope.

EXAMPLE I

A sample of porous carbon identified as PC 58 from Stackpole Carbon Co., St. Marys, PA., which is largely amorphous carbon, weighing 17.8 g was thoroughly washed in water and then electrochemically oxidized in an unseparated electrochemical cell containing 5% aqueous sulfuric acid solution at 25° C. The Stackpole carbon sample served as the anode. A carbon rod was used as a cathode and a saturated calomel electrode (SCE) was placed near the anode to monitor and control the anode potential. The solution was magnetically stirred while the sample was electrochemically oxidized by means of a potentiostat at a controlled potential of +1.30 V vs SCE measured between the sample and SCE. The current was initially 600 mA at a cell voltage of 13 V. After 35 minutes the potential of the anode was increased to +2.50 V to provide a current of about 1.0 A at a cell voltage of 22 V. After passage of 17,200 coulombs the reaction was stopped and the oxidized sample washed well with distilled water and dried.

The oxidized sample was placed in a Monel pressure vessel in an efficient fume hood, cooled with dry-ice acetone, flushed with dry nitrogen, and evacuated to 1 mm with a vacuum pump. Sulfur tetrafluoride (about 45 g) was introduced and the reaction was held at room temperature at 105 psi for about 1 hour. Then the temperature of the reactor was raised to 150° C. and held at this temperature for 24 hours. On cooling to room temperature, excess reagent and gaseous products were vented into a trap containing aqueous caustic. The reactor and mildly fluorinated carbon was purged several times with dry nitrogen. The sample was removed, washed well with water and dried in a dessicator over $P_2O_5$ in vacuo. The weight of the final sample was 18.2 g. The elemental analysis showed the presence of 4.0% fluorine.

To demonstrate the use of these fluorinated carbons in batteries, the specifically fluorinated carbon was placed in an electrochemical cell containing a counter electrode of lithium metal and an anhydrous solution of lithium perchlorate (0.25M) in propylene carbonate, under a helium atmosphere. An open circuit potential of 3.1 V was measured with a digital voltmeter. A current of about 2 mA was observed with a resistance inserted in the circuit of 1000 ohms.

EXAMPLE II

To demonstrate the results of chemical oxidation and fluorination, 50 g of carbon fibers available under the designation Thornel-50, a trademark of Union Carbide are placed in a glass beaker with 500 ml of aqueous sodium hypochlorite solution (5%), heated to 50° C. and magnetically stirred for 12 hours. The oxidized carbon fibers are rinsed in water, 5% aqueous sulfuric acid, washed well with water and then thoroughly dried.

The sample is next placed in a Monel reactor and heated to 200° C. at atmospheric pressure, while purging with a continuous stream of andydrous hydrogen fluoride for 5 hours. The reactor is then cooled, flushed with dry nitrogen, and 100 g of sulfur tetrafluoride is introduced, according to the method of EXAMPLE I. Upon reaction at 200° C. for 24 hours under pressure, the reactor is cooled and excess reagent and gaseous products vented and removed as before. The thoroughly washed and dried sample is next fluorinated in the same reactor, which is initially flushed with dry nitrogen, by slowly (about 10 ml/min) passing a dilute fluorine/nitrogen mixture (about 10% by volume $F_2$) over the sample for 30 minutes. During the course of this process the reactor temperature rises to about 250° C. as a result of the exothermic heat of reaction. The reactor and sample are next cooled by means of a stream of pure nitrogen which also serves to clean the carbon sample of absorbed gaseous contaminants. Finally, the sample is carefully washed and dried. Analysis shows that the fluorine content is significantly less in the mild fluorination step with $SF_4$, but the fluorine content is substantially increased in the next step using the dilute fluorine mixture.

The sample is easily wetted after chemical oxidation demonstrating the hydrophilic nature of the carbon oxide surface. After fluorination with $SF_4$ and then with dilute fluorine, the samples are distinctly hydrophobic in character and water does not substantially wet the samples.

EXAMPLE III

A flooded air cathode available from Prototech, Newton Highlands, Ma., consisting of high surface area carbon and Teflon ® fibers and containing 0.5 mg/cm$^2$ of platinum catalyst is removed from a phosphoric acid fuel cell which had been operating at 195° C. for 6 months but had failed. This electrode is observably hydrophilic and is prepared for specific fluorination by washing thoroughly in distilled water and drying at 100° C. in vacuo for 24 hours.

Upon mild fluorination with sulfur tetrafluoride, which is used in excess, the selectively fluorinated gas diffusion electrode, is removed from the reactor, washed well (it is observably hydrophobic), and returned to use in a phosphoric acid fuel cell.

EXAMPLE IV

A gas diffusion electrode having Catalogue No. PSN available from the Prototech Co. consisting of Vulcan XC-72 carbon mixed with Teflon ® fiber, containing 0.5 mg/cm$^2$ of platinum catalyst, on a silver plated nickel screen is placed in a small test cell. A nickel electrode served as the counter electrode and the electrolyte is 23% aqueous NaOH solution at 75° C. Air is introduced to the gas side of the gas diffusion electrode, and at a current density of 300 amp/ft$^2$, the electrode potential is −0.26 V vs Hg/HgO as a reference. After 1000 hours of continuous operation, the electrode potential is −0.26 V and after 20,000 hours, the electrode potential is degraded to −0.41 V vs Hg/HgO.

This irreversibly flooded gas diffusion electrode is removed from the cell, soaked in distilled water to remove caustic, thoroughly dried and fluorinated with $SF_4$ at 150 psi, 150° C. for 4 days. The electrode is washed with distilled water and remounted in the test cell described above. At 300 amp/ft$^2$, the electrode potential is −0.28 V vs Hg/HgO and after continuous operation for 10,000 hours the electrode potentiual is −0.29 V, thereby demonstrating that the performance of a flooded air depolarized cathode can be restored utilizing the present invention, and moreover that such a restored electrode is greatly improved in useful lifetime as compared to the untreated electrode.

EXAMPLE V

A glass electrochemical cell was used, having two compartments separated by a medium porosity glass frit. Anodes (3 mm diameter×150 mm) consisted of preoxidized and mildly fluorinated (with SF$_4$) vitreous carbon rods, fluorinated to a level of about 5% fluorine by elemental analysis, or untreated rods were used as controls. The cathode was stainless steel. The anode side of the cell had provision for an argon gas inlet and a gas outlet. The inlet and outlet were of glass tubing with the inlet extending below the surface of the anolyte solution (100 ml), consisting of either sulfuric acid or tetrafluoroboric acid and the outlet dipping into an ozone indicating solution consisting of 0.2M aqueous potassium iodide (100 ml). Power was supplied to the cell by a Gates DC Power Supply. Current was measured by a Beckman 310 Multimeter. The charge was integrated with a Model 640 Digital Coulometer from The Electrosynthesis Co., E. Amherst, N.Y. Current efficiency for ozone generation was determined by iodometric titration of the ozone indicating solution using standard sodium thiosulfate solution as compared to the theoretical production of ozone according to the total charge passed.

Table 1 compares fluorinated vs unfluorinated vitreous carbon, various anolyte solutions, the role of current density, and temperature. The results in Table 1 demonstrate that the ozone current efficiency is significantly improved over the untreated anode material, when fluorinated vitreous carbon is used as the anode. Moreover, unfluorinated anodes (controls) are severely degraded in aqueous H$_2$SO$_4$ solution, whereas fluorinated anodes under the same conditions survive intact, thereby clearly demonstrating the useful protection achieved by fluorination according to the methods of the present invention. The results also indicate that conc. aqueous HBF$_4$ is preferred as anolyte and that efficient cooling is required for optimal results.

TABLE 1

Electrochemical Generation of Ozone

| Experiment No. | Anode Material | Anolyte Solution | Current Density mA/cm$^2$ | Current Efficiency % | Temp. °C. | Condition of Anode |
|---|---|---|---|---|---|---|
| 1 | Not fluorinated | 5M H$_2$SO$_4$ | 300 | 0.068 | 5 | Degraded severely |
| 2 | Fluorinated | 5M H$_2$SO$_4$ | 300 | 0.56 | 5 | Intact, discolored |
| 3 | Not fluorinated | 48% HBF$_4$ | 300 | 42 | −15 | No change |
| 4 | Fluorinated | 48% HBF$_4$ | 300 | 49 | −15 | No change |
| 5 | Not fluorinated | 48% HBF$_4$ | 500 | 5.4 | 10 | Slightly degraded |
| 6 | Fluorinated | 48% HBF$_4$ | 500 | 18 | 10 | No change |

EXAMPLE VI

The fluorination of two different carbon blacks, Cabot Co. Vulcan XC-72, and Anderson Development Co. Super AX-21 were compared. Vulcan XC-72 is commonly used in fuel cell electrodes and has a surface area (BET) of about 250 m$^2$/g. Super AX-21 is more amorphous in character and has a very high surface area of about 3500 m$^2$/g useful in absorbing a variety of toxic substances and is also distinguished by a high water content of about 65% by weight. Prior to fluorination each carbon was thoroughly dried in a dessicator over P$_2$O$_5$ at 100° C. for 48 hours.

Following the fluorination procedure described in U.S. Pat. No. 3,340,081, the dried carbon (10 g) was placed in a 1 liter Parr Bomb, the apparatus evacuated, and about 100 g of sulfur tetrafluoride introduced. The reactor was then heated to 150° C. and was maintained at that temperature for 5.5 hours. On cooling to room temperature, the excess gas was vented, the reactor flushed several times with nitrogen and the fluorinated sample removed, washed well with water and dried.

A second set of samples (25 g) of Vulcan XC-72 and Super AX-21 were preoxidized to develop potential sites of instability, by magnetically stirring the carbon in 1 liter of 1M aqueous ammonium persulfate solution or in aqueous household bleach (5% active chlorine) for 24 hours at room temperature. The oxidized carbon was filtered, washed well with water and thoroughly dried in a dessicator over P$_2$O$_5$ at 100° C. for 48 hours. Fluorination of 10 g samples was then conducted as described above.

The results of Table 2 demonstrate that preoxidation followed by fluorination according to the methods of the present invention greatly increases the fluorine content, compared to fluorination alone following the U.S. Pat. No. 3,340,081.

This significant increase in fluorine content is related to the greater level of surface oxides formed upon preoxidation. A measure of the quantity of some surface oxide groups may be obtained by titration with base. Table 2 shows the results of titration with aqueous NaOH, which provides the quantity of strong plus weaker acids. Titration with aqueous NaHCO$_3$, identifies the level of stronger acids only. Strong acids are believed to be carboxylic groups whereas weaker acids are largely phenolic or enolic in nature. Thus the higher surface oxide levels achieved by preoxidation of carbons affords a higher level of specific fluorination of carbons because of the presence of more available sites for fluorination with a soft fluorinating agent.

TABLE 2

COMPARISON OF FLUORINATION AND SURFACE OXIDATION METHODS OF CARBONS

| | VULCAN XC-72 | SUPER AX-21 |
|---|---|---|
| A: Fluorination | | |
| Without preoxidation | 2.5% F | 3.0% F |
| Preoxidized with | | |
| (a) 1M (NH$_4$)$_2$ S$_2$O$_8$ | 6.6% F | 9.6% F |
| (b) NaOCl | 9.4% F | 10.5% F |
| B. Surface Oxide Titrations | | |
| Without preoxidation | | |
| [NaOH], meq/g | 0.40 | 0.29 |
| [NaHCO$_3$], meq/g | 0.11 | 0.05 |
| Preoxidized carbon (NH$_4$)$_2$ S$_2$O$_8$ | | |
| [NaOH], meq/g | 0.69 | 2.97 |
| [NaHCO$_3$], meq/g | 0.15 | 1.43 |

While the invention has been described in conjunction with specific examples thereof, this is illustrative only. Accordingly, many alternatives, modifications and variations will be apparent to persons skilled in the art in light of the foregoing description and it is therefore intended to embrace all such alternatives and modifications as to fall within the spirit and broad scope of the appended claims.

I claim:

1. A method of making a specifically fluorinated carbon, which comprises the steps of preoxidizing a carbon, and fluorinating the preoxidized carbon by specific fluorination to form a preoxidized, specifically fluorinated carbon.

2. The method of claim 1 wherein the carbon is a material selected from an amorphous or crystalline carbon.

3. The method of claim 2 wherein the amorphous carbon is a carbon black and the carbon black is preoxidized and specifically fluorinated at least to 8 percent by weight fluorine.

4. The method of claim 2 wherein the amorphous carbon is a carbon selected from the group consisting of, glassy carbons, soot and charcoal, said amorphous carbon being fluorinated with a mild fluorinating agent to a level from about 0.1 to about 20 percent by weight fluorine.

5. The method of claim 2 wherein the crystalline carbon comprises a graphitic carbon preoxidized and specifically fluorinated to at least 0.01 percent by weight fluorine.

6. The method of claim 1 wherein the carbon is a carbon substrate preoxidized and specifically fluorinated to at least 0.001 percent by weight fluorine.

7. The method of claim 6 wherein the carbon substrate is selected from the group consisting of carbon steel, carbon electrode, structural composite and catalyst support.

8. The method of claim 6 wherein the carbon substrate is selected from a battery electrode, fuel cell electrode, bifunctional air electrode and vitreous carbon electrode.

9. The method of claim 1 including the step of post-fluorinating the preoxidized specifically fluorinated carbon with a moderate or hard fluorinating agent.

10. The method of claim 9 wherein the post-fluorinated carbon has a fluorine content ranging from about 0.5 to about 65 percent by weight.

11. The method of claim 10 wherein the post-fluorination step is conducted with a material selected from the group consisting of $F_2$, ClF, ClF$_3$, BrF$_3$ and MF$_n$ wherein M is cobalt, antimony, manganese, cerium or uranium and n is a number corresponding to the highest oxidation state of M.

12. The method of claim 6 including the step of cleaning the preoxidized carbon substrate before specifically fluorinating.

13. The method of claim 12 wherein the fluorination step is performed with a soft fluorinating agent of the formula: R—SF$_3$ wherein R is fluorine, alkyl, aryl, aralkyl or dialkylamino.

14. The method of claim 12 wherein the soft fluorinating agent is sulfur tetrafluoride.

15. A method of regenerating an oxidized or flooded carbon-containing electrode, which comprises the steps of cleaning the electrode, and specifically fluorinating the cleaned electrode.

16. The method of claim 15 wherein the oxidized or flooded electrode is selected from fuel cell electrodes and bifunctional air electrodes.

17. A method for extending the useful life of a vitreous or glassy carbon electrode, which comprises the steps of preoxidizing the electrode and fluorinating the preoxidized electrode by specific fluorination.

18. The method of claim 17 wherein the electrode is a glassy carbon anode for use in corrosive electrolytes.

19. The method of claim 17 wherein the electrode is a glassy carbon anode for the electrochemical generation of ozone.

20. The method of claim 17 wherein the electrode is a glassy carbon anode for the electrochemical generation of an inorganic persulfate.

21. A method of making a specifically fluorinated carbon, which comprises the steps of preoxidizing a carbon, cleaning the preoxidized carbon, and specifically fluorinating the preoxidized and cleaned carbon in the presence of a catalyzing amount of HF, BF$_3$ or a metal fluoride salt to form a preoxidized, specifically fluorinated carbon.

22. The method of claim 21, including the step of post-fluorinating the preoxidized specifically fluorinated carbon with a moderate or hard fluorinating agent.

23. A preoxidized, specifically fluorinated carbon or carbon substrate having a fluorine content of at least 8 percent by weight fluorine.

24. The preoxidized, specifically fluorinated carbon or carbon substrate of claim 23 wherein the carbon or carbon substrate comprises an amorphous type carbon.

25. The preoxidized, specifically fluorinated carbon or carbon substrate of claim 24 wherein the amorphous carbon or carbon substrate is post-fluorinated.

26. A preoxidized, specifically fluorinated carbon or carbon substrate comprising a carbon selected from the group consisting of glassy carbon, soot and charcoal.

27. The preoxidized, specifically fluorinated carbon of claim 26 wherein the carbon is in the form of a powder, cloth, felt or fiber.

28. The preoxidized, specifically fluorinated carbon of claim 26 wherein the carbon or carbon substrate is post-fluorinated.

29. A preoxidized, specifically fluorinated crystalline carbon or carbon substrate comprising a crystalline carbon.

30. The preoxidized, specifically fluorinated crystalline carbon or substrate of claim 29 which is post-fluorinated.

31. A specifically fluorinated crystalline carbon or carbon substrate comprising a crystalline carbon.

32. The specifically fluorinated crystalline carbon or carbon substrate of claim 31 wherein the crystalline carbon is in the form of graphite cloth, felt or fiber.

33. A carbon which comprises a specifically fluorinated vitreous or glassy carbon.

34. The method of claim 2 wherein the amorphous carbon is activated carbon, said carbon being fluorinated with a mild fluorinating agent to a level from about 0.1 to about 20 percent by weight fluorine.

35. A preoxidized, specifically fluorinated carbon or carbon substrate comprising activated carbon.

* * * * *